United States Patent
Sakai

(10) Patent No.: US 10,353,198 B2
(45) Date of Patent: Jul. 16, 2019

(54) HEAD-MOUNTED DISPLAY WITH SOUND SOURCE DETECTION

(75) Inventor: Juri Sakai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 176 days.

(21) Appl. No.: 13/328,897

(22) Filed: Dec. 16, 2011

(65) Prior Publication Data

US 2012/0162259 A1    Jun. 28, 2012

(30) Foreign Application Priority Data

Dec. 24, 2010  (JP) .............................. P2010-286934

(51) Int. Cl.
*G09G 5/00* (2006.01)
*G02B 27/00* (2006.01)
(Continued)

(52) U.S. Cl.
CPC ........ *G02B 27/0093* (2013.01); *G01S 3/8083* (2013.01); *G02B 27/017* (2013.01);
(Continued)

(58) Field of Classification Search
CPC .................. G06F 3/011; G06F 3/0213; G06F 2221/2111; G06F 3/167; G06F 2221/2149; G06F 3/0418; A61B 5/0205; A61B 5/0022; G06Q 10/10; G06Q 20/00; G06Q 40/02; G06Q 20/045; G01S 3/8036; G01S 5/0252; G01S 5/0257; G01S 3/8083; H04R 3/005; H04R 1/028; G06T 13/40; G06T 19/006;
(Continued)

(56) References Cited

U.S. PATENT DOCUMENTS 5,901,232 A *  5/1999  Gibbs .................... H04R 1/406
                                                    381/92
6,456,274 B1*  9/2002  Van Hemert ................. 345/418
(Continued)

FOREIGN PATENT DOCUMENTS

| | | |
|---|---|---|
| ES | 2 245 203 | 12/2005 |
| JP | 8-179791 | 7/1996 |
| JP | 2004/021031 | 3/2004 |
| JP | 2007-334149 | 12/2007 |
| JP | 2008/257323 | * 10/2008 |
| WO | WO 2009/156145 | 12/2009 |

OTHER PUBLICATIONS

European Search Report dated Mar. 22, 2012 from the European Patent Office for EP Application No. 11189470.5-2217.

*Primary Examiner* — Charles Tseng
(74) *Attorney, Agent, or Firm* — Chip Law Group

(57) ABSTRACT

A sound information display device including: a plurality of sound collecting units; an information obtaining unit that obtains positional information and sound information of a sound source based on collected sound information of the plurality of sound collecting units; a display data generation unit that generates display data for displaying sound information that is obtained by the information obtaining unit overlaid on a visual image at a position that corresponds to positional information that is obtained by the information obtaining unit within the visual image; and a head-mounted image display unit that displays sound information of a sound source overlaid on the visual information at a position that corresponds to the sound source within the visual image based on display data that is generated by the display data generation unit.

20 Claims, 13 Drawing Sheets

(51) Int. Cl.
*G06T 19/00* (2011.01)
*G01S 3/808* (2006.01)
*G02B 27/01* (2006.01)
*H04R 1/02* (2006.01)
*H04S 7/00* (2006.01)
*G02C 11/00* (2006.01)
*H04R 1/40* (2006.01)

(52) U.S. Cl.
CPC ............ *G02C 11/10* (2013.01); *G06T 19/006* (2013.01); *H04R 1/028* (2013.01); *H04S 7/40* (2013.01); *G02B 2027/0178* (2013.01); *H04R 1/406* (2013.01); *H04R 2410/07* (2013.01)

(58) Field of Classification Search
CPC .. G09G 2340/12; G09G 2340/14; G09G 5/00; G06K 19/0723; G06K 19/0728; G05D 2201/0209; G02C 11/10; G02B 2027/0178; G02B 27/0093; G02B 27/017–0176; H04L 12/1818; H04L 67/02
USPC ....................................................... 345/633
See application file for complete search history.

(56) References Cited

U.S. PATENT DOCUMENTS

| | | | |
|---|---|---|---|
| 6,600,824 B1* | 7/2003 | Matsuo | H04R 3/005 381/122 |
| 8,189,430 B2* | 5/2012 | Kitaura | 367/127 |
| 2002/0097885 A1 | 7/2002 | Birchfield et al. | |
| 2002/0103649 A1 | 8/2002 | Basson et al. | |
| 2005/0246167 A1 | 11/2005 | Nakajima et al. | |
| 2006/0224438 A1* | 10/2006 | Obuchi | G06Q 30/02 704/270 |
| 2007/0195012 A1* | 8/2007 | Ichikawa | G02B 27/017 345/8 |
| 2010/0188929 A1* | 7/2010 | Kitaura | G06F 1/1605 367/13 |
| 2010/0265164 A1* | 10/2010 | Okuno | 345/8 |
| 2010/0302401 A1* | 12/2010 | Oku | H04N 5/23293 348/222.1 |
| 2012/0163625 A1* | 6/2012 | Siotis et al. | 381/92 |
| 2012/0320088 A1* | 12/2012 | Ihara | G05B 23/0216 345/629 |

* cited by examiner

10

10

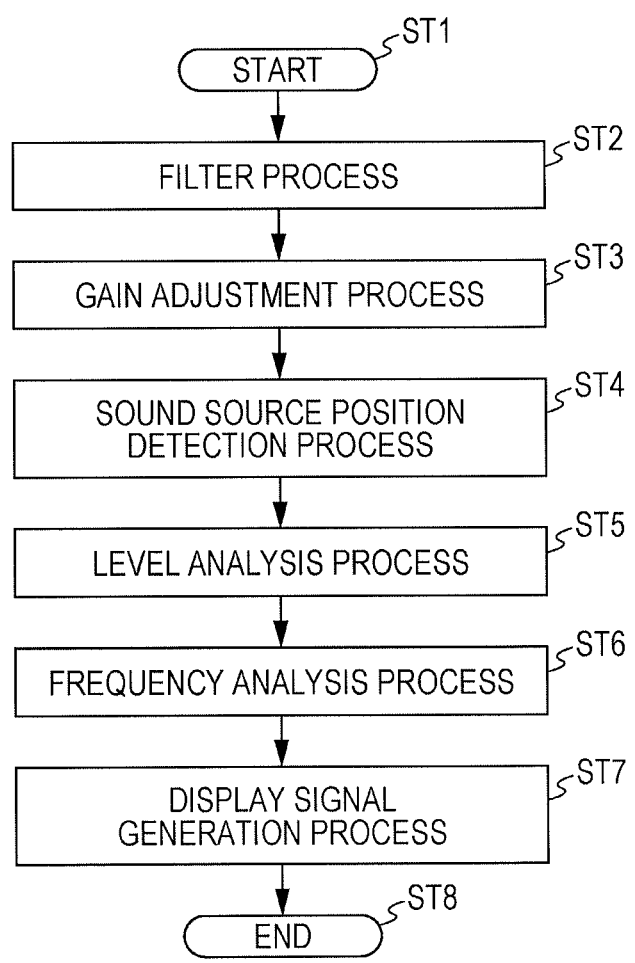

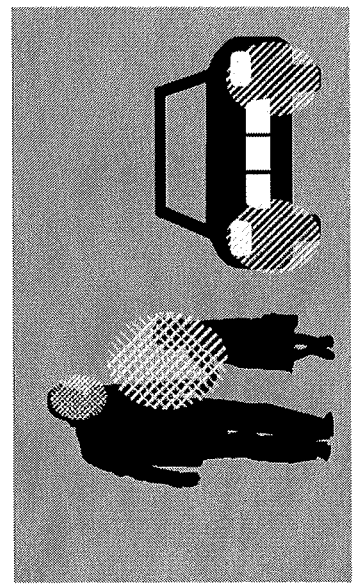
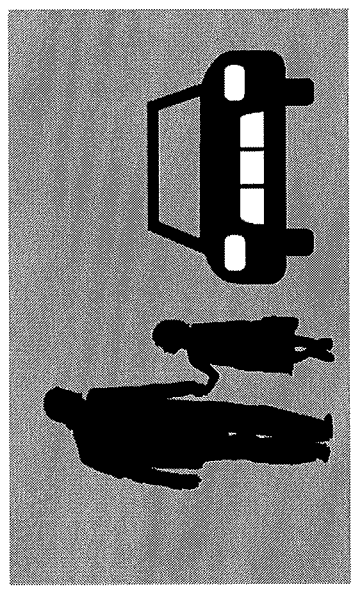
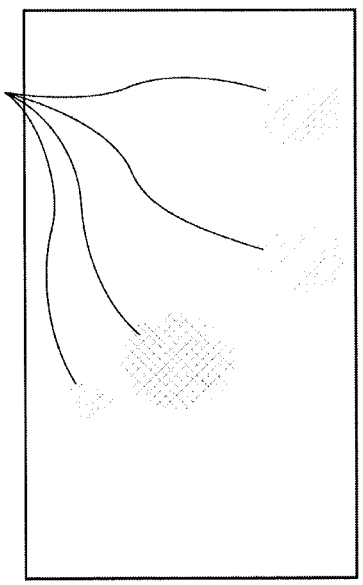

10A

10B

10B

HEAD-MOUNTED DISPLAY WITH SOUND SOURCE DETECTION

BACKGROUND

The present disclosure relates to a sound information display device, a sound information display method, and a program, and particularly relates to a sound information display device that displays sound information of a sound source overlaid on a visual image on a head-mounted display and the like.

A technique for estimating the position of a sound source and the strength of a sound by a plurality of microphones is described in Domestic Re-Publication of PCT International Publication for Patent Application No. 2004-021031. Further, a head-mounted display for the hearing impaired that recognizes the arrival direction of a sound source by a plurality of microphones and which outputs words and onomatopoeias that correspond to the recognition result as character information is described in Japanese Unexamined Patent Application Publication No. 2007-334149. Furthermore, a visualization device that extracts sound information from an input image, categorizes and identifies what such sounds are, and associates the sounds with a still image within the image is described in Japanese Unexamined Patent Application Publication No. 08-179791.

SUMMARY

Techniques for estimating the sound source direction or techniques for ascertaining the strength of sounds therefrom (refer to Domestic Re-Publication of PCT International Publication for Patent Application No. 2004-021031) have already been established and are used mainly for measurements. However, since precision is demanded in the field of measurements, devices are currently large in scale. On the other hand, such a sound source direction estimation technique may become a tool for searching for a sounding body for the general population or a tool to aid hearing for the hearing impaired.

The technique described in Japanese Unexamined Patent Application Publication No. 2007-334149 described above is a glasses-type head-mounted display, and is geared toward general pedestrians. However, the arrival direction of a sound source is displayed as characters, which is hard to understand intuitively. Furthermore, while the recognition result is expressed using mimetic words, there may be individual differences in the expressing of the sounds of a sounding body.

Further, the technique described in Japanese Unexamined Patent Application Publication No. 08-179791 described above requires an extensive database, and furthermore, the identification of sounding bodies that are hidden within the image or of sounding bodies that arrive from outside the image is difficult.

It is desirable for a user to be able to intuitively determine information regarding the position of a sound source and the sounds that are produced by the sound source.

The gist of an embodiment of the disclosure is a sound information display device including: a plurality of sound collecting units; an information obtaining unit that obtains positional information and sound information of a sound source based on collected sound information of the plurality of sound collecting units; a display data generation unit that generates display data for displaying sound information that is obtained by the information obtaining unit overlaid on a visual image at a position that corresponds to the positional information that is obtained by the information obtaining unit within the visual image; and a head-mounted image display unit that displays sound information of a sound source overlaid on the visual image at a position that corresponds to the sound source within the visual image based on display data that is generated by the display data generation unit.

The embodiments of the disclosure include a plurality of sound collecting units, for example, a plurality of microphones. Positional information of a sound source and sound information are obtained by the information obtaining unit based on collected sound information of the plurality of sound collecting units. For example, the sound information is sound level information of sounds that are output from the sound source, frequency information of sounds that are output from the sound source, or the like.

Display data for displaying the sound information that is obtained by the information obtaining unit is generated by the display data generation unit. The display data is generated to display the sound information at a position within a visual image which corresponds to the positional information that is obtained by the information obtaining unit to be overlaid on the visual image.

For example, the display data is generated to display level information of sounds that are output from a sound source using the size of a predetermined shape such as a circle. In such a case, it becomes possible to determine a sense of perspective. For example, it is possible to determine that the sound source is approaching from a gradually enlarging circle. Further, for example, the display data is generated to display the frequency information of sounds that are output from a sound source with a color that is applied to the predetermined shape such as the circle. In such a case, it is possible to find a specific sound source based on the color.

Sound information of the sound source is displayed on a head-mounted image display unit based on the display data that is generated by the display generation unit. In such a case, the sound information is displayed overlaid on an image at a position that corresponds to the sound source within the visual image to be overlaid on the visual image. For example, in a case when the sound source position is within the visual image, the sound information is displayed at the sound source position or in the vicinity thereof. Further, for example, in a case when the sound source position is not within the visual image, the sound information is displayed on an end portion of the visual image which is close to the sound source position. The head-mounted image display unit may, for example, be a transmissive image display unit. In such a case, the visual image is an actual image that the user may observe through the image display unit.

Further, for example, the head-mounted image display unit may be a non-transmissive image display unit. In such a case, an imaging unit for obtaining image data of a visual image is disposed on the image display unit, and the display data that is generated by the display data generation unit is superimposed on the image data that is obtained by the imaging unit. Furthermore, while the visual image is displayed on the image display unit based on the superimposed data, the sound information of the sound source is displayed overlaid at a position that corresponds to the sound source within the visual image. That is, the visual image in such a case is a display image that is displayed on the image display unit.

In such a manner, in the embodiments of the disclosure, since the sound information of the sound source is displayed overlaid at a position that corresponds to the sound source within the visual image, it is possible for the user to intuitively determine the position of the sound source and the information of the sounds that are output from the sound source. Further, in the embodiments of the disclosure, the positional information of the sound source and the sound information is obtained based on the collected sound information of a plurality of sound collecting units, and even with regard to a sound source that is hidden in a predetermined object within the visual image, is able to be displayed with the sound information of the sound source at a position that corresponds to the sound source within the visual image overlaid on the hidden sound source.

In the embodiments of the disclosure, for example, the plurality of sound collecting units may be displayed on the image display unit and a surface that is configured by the disposal positions of the plurality of sound collecting units may not be orthogonal to the display surface of the image display unit. In such a case, it is easy to perform obtaining of the sound source position over the display surface of the image display unit, that is, over a two-dimensional plane. For example, the surface that is configured by the disposal position of the plurality of sound collecting units may be parallel to the display surface of the image display unit. In such a case, an operation for obtaining the sound source position over the display surface of the image display unit becomes easy.

Further, in the embodiments of the disclosure, for example, the plurality of sound collecting units may include a plurality of omnidirectional sound collecting units and a plurality of directional sound collecting units, and the information obtaining unit may obtain first directional information of the sound source based on the collected sound information of the plurality of omnidirectional sound collecting units, may obtain second directional information of the sound source in the disposal positions of the plurality of directional sound collecting units by controlling the directional direction of the plurality of directional sound collecting units based on the first directional information, and may obtain positional information of the sound source based on the second directional information. In such a case, it is possible to improve the obtained accuracy of the positional information of the sound source without increasing the number of sound collecting units.

Further, in the embodiments of the disclosure, for example, a sound source specifying unit that specifies the sound source as a target for the information obtaining unit to obtain the positional information and the sound information may be further included. For example, in the sound source specifying unit, the sound source as a target for obtaining the sound information by the frequency may be specified. In such a case, it is possible to display only the sound information of a specific sound source within the visual image, and searching of a specific sound source becomes easy.

According to the embodiments of the disclosure, since the sound information of a sound source is displayed overlaid at a position that corresponds to the sound source within a visual image, it is possible for the user to intuitively determine the position of the sound source and the information of the sounds that are output from the sound source, and, for example, aiding of hearing using the sense of sight of the hearing impaired or the like is possible.

BRIEF DESCRIPTION OF THE DRAWINGS

FIGS. 2A and 3B are diagrams for describing the relationship between a surface that is configured by the disposal positions of four microphones and a display surface;

FIG. 6 is a flowchart that illustrates a processing order of a signal processing unit that configures the transmissive HMD system;

FIGS. 7A to 7C are diagrams that illustrate a display example in which sound information is displayed overlaid at a position that corresponds to a sound source within a visual image;

DETAILED DESCRIPTION OF EMBODIMENTS

The embodiments of the disclosure will be described below. Here, description will be given in the following order.
1. First Embodiment
2. Second Embodiment
3. Third Embodiment
4. Fourth Embodiment
5. Modified Examples 1. First Embodiment

[Configuration Example of Transmissive Head-Mounted Display]

Figure 1:
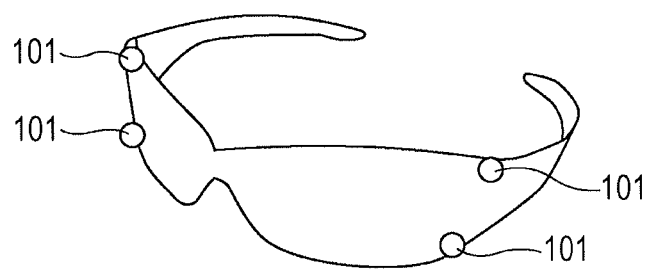
FIG. 1 is a diagram that illustrates the appearance of a transmissive head-mounted display (transmissive HMD) as a first embodiment of the disclosure.

FIG. 1 illustrates the appearance of a transmissive head-mounted display (transmissive HMD) 10 as a first embodiment. Four directional microphones 101 are disposed on the front face of the transmissive HMD 10. All of the microphones are disposed with a certain gap therebetween in order to improve the precision of sound source position detection. Here, a microphone 101 configures a sound collecting unit.

In such a case, a surface that is configured by the disposal positions of the four microphones 101 is not orthogonal to a display surface of the transmissive HMD 10. In such a case, the four microphones 101 include those in which the disposal positions in the horizontal direction of the display surface are different and those in which the disposal positions in the vertical direction of the display surface are different.

Figure 2A:
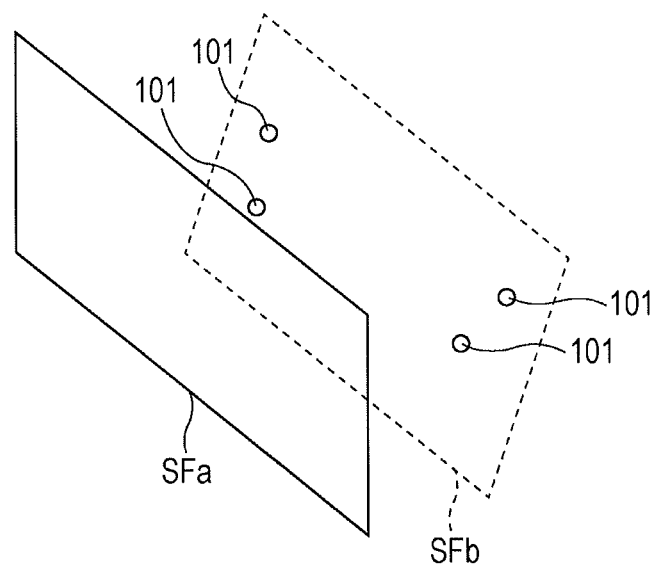

FIG. 2A illustrates such a state. In FIG. 2A, the solid square schematically indicates a display surface SFa, and the dotted square indicates a surface SFb that is configured by the disposal positions of the four microphones 101. In such a case, the surface SFb becomes the surface in a case when the surface SFb is projected on the display surface SFa. Accordingly, it becomes easy to obtain the sound source position over the display surface SFa, that is, over a two-dimensional plane, based on collected sound information (sound signals) of the four microphones 101 described later.

Figure 2B:
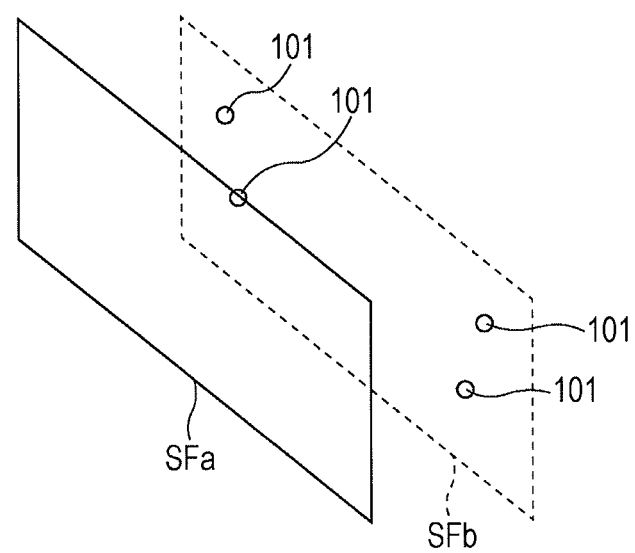

Here, as illustrated in FIG. 2B, the four microphones 101 may be disposed on the transmissive HMD 10 such that the surface SFb becomes parallel to the surface SFa. In such a case, the operation of obtaining the sound source position over the display surface SFa, that is, over a two-dimensional plane based on the collected sound information by the four microphones 101 described later becomes easy.

Figure 3:
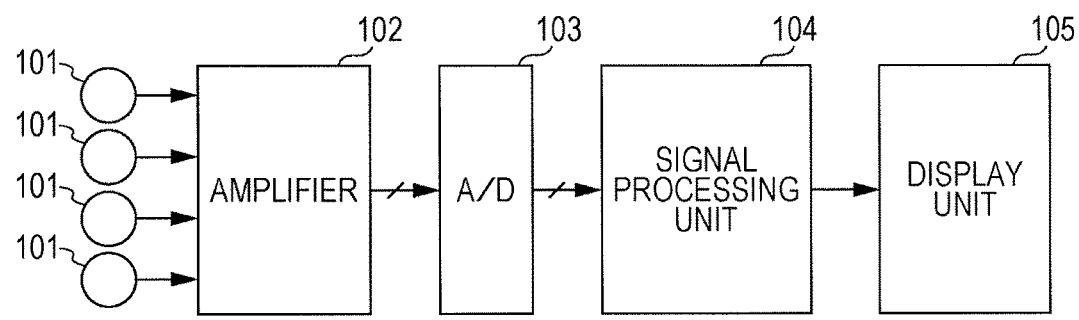
FIG. 3 is a block diagram that illustrates a configuration example of a transmissive HMD system as the first embodiment of the disclosure.

FIG. 3 illustrates a system configuration of the transmissive HMD 10 as the first embodiment. The transmissive HMD 10 includes the four microphones 101, an amplifier 102, an analog-digital converter 103, a signal processing unit 104, and a display unit 105. The amplifier 102 amplifies the collected sound information (sound signals) of the four microphones 101. The analog-digital converter 103 converts the collected sound information (sound signals) of the four microphones 101 amplified by the amplifier 102 from analog signals into digital signals.

The signal processing unit 104 obtains positional information of a sound source and sound information based on the collected sound information (sound signals) of the four microphones 101 obtained by the analog-digital converter 103 and generates display data for displaying the sound information. The display data displays the sound information overlaid on a visual image at a position that corresponds to the positional information within the visual image. Here, the position that corresponds to the positional information within the visual image includes not only positions that are indicated by the positional information but positions in the vicinity of the positions indicated by the positional information. By including such vicinity positions, it becomes possible, for example, for the user to watch a sound source image within the visual image without an obstruction of the display of the sound information. The signal processing unit 104 configures an information obtaining unit and a display data generation unit.

In the embodiment, the sound information is the level information and the frequency information of the sounds that are output from the sound source. The signal processing unit 104 generates the display data so that the level information of the sounds that are output from the sound source is displayed using the size of a predetermined shape, a circle (includes ellipses) in the embodiment. Further, the signal processing unit 104 generates the display data so that the frequency information of the sounds that are output from the sound source is displayed in a color that is applied to the above circle.

The display unit 105 displays the sound information of the sound source overlaid on a visual image at a position that corresponds to a sound source within the visual image based on the display data that is generated by the signal processing unit 104. In such a case, in a case when the sound source position is within the visual image, the sound information is displayed at the sound source position or in the vicinity thereof. Further, in such a case, in a case when the sound source position is not within the visual image, the sound information is displayed on an end portion of a visual image that is close to the sound source position. The display unit 105 is configured by a display of a transmissive structure in which a backlight unit is removed from a liquid crystal display (LCD).

Figure 4:
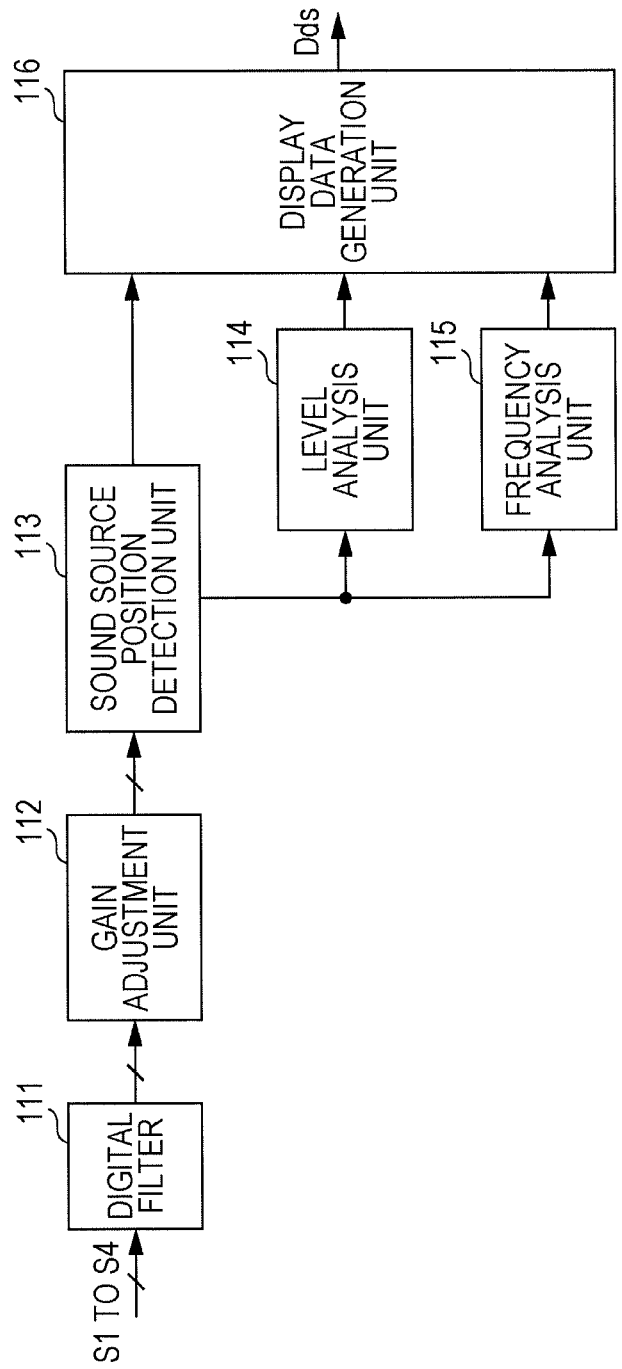
FIG. 4 is a block diagram that illustrates a configuration example of a signal processing unit that configures the transmissive HMD system.

FIG. 4 illustrates a detailed configuration of the signal processing unit 104. The signal processing unit 104 includes a digital filter 111, a gain adjustment unit 112, a sound source position detection unit 113, a level analysis unit 114, a frequency analysis unit 115, and a display data generation unit 116. The digital filter 111 performs filter processing to remove or reduce frequency components such as wind noise or the rustling noise of fabrics that are included in collected sound information (sound signals) S1 to S4 of the four microphones 101. The reason is that such frequency components detrimentally affect the sound source position detection process and the like.

The digital filter 111 is configured, for example, by an FIR (Finite-duration Impulse Response) filter or an IIR (Infinite-duration Impulse Response) filter. For example, the digital filter 111 configures a high-pass filter or a bandpass filter. Further, for example, in a case when there is noise of a specific frequency that is not to be detected, the digital filter 111 configures a notch filter that blocks a portion of the bandwidth.

The gain adjustment unit 112 cuts low level signals such as reflected sounds and stationary sounds from the collected sound information (sound signals) S1 to S4 of the four microphones 101. The reason is that such low level signals have a detrimental effect on the sound source position detection process and the like. The gain adjustment unit 112 is configured, for example, by an automatic control circuit that performs gain control according to the input signal level.

The sound source position detection unit 113 detects the positional information of a sound source based on the collected sound information (sound signals) S1 to S4 of the four microphones 101. The sound source position detection unit 113 detects positional information with the display surface of the transmissive HMD 10, that is, the display surface (two-dimensional plane) of the display unit 105 as the X-Y coordinate plane. The sound source position detection process by the sound source position detection unit 113 is divided into a process with three stages of (1) ascertaining the difference in arrival times of sounds from the sound source to each of the microphones 101, (2) calculating the arrival angles of the sounds from the sound source, and (3) estimating the sound source position. The processes of each stage will be described below.

(1) The process of ascertaining the difference in arrival times will be described. Although a detailed description of the process will be omitted, the process is performed by a common method of the related art. For example, a method of ascertaining using a cross-correlation function, a CSP method (cross-power spectrum phase analysis) using a Fourier transform, or the like is common.

Figure 5A:
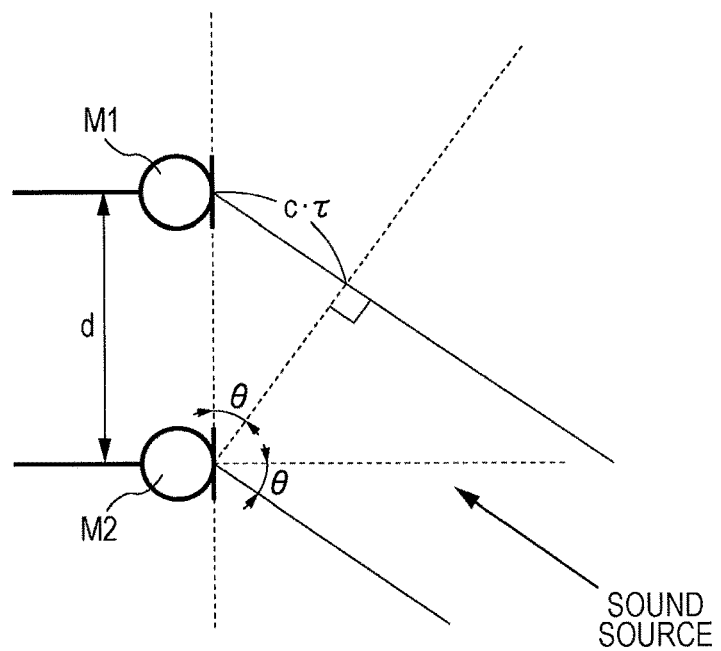
FIGS. 5A and 5B are diagrams for describing an example of a calculation method of an arrival angle that is used for sound source position detection.
Figure 5B:
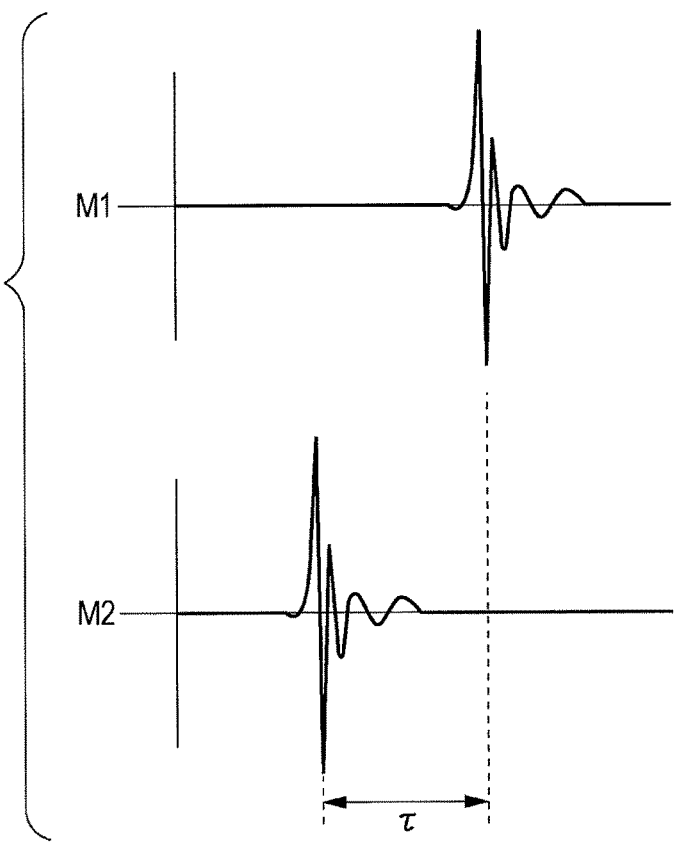

(2) The process of calculating the arrival angle will be described. The sound source position detection unit 113 performs a calculation process of the respective arrival angles for each pair of microphones that are extracted from the four microphones 101. FIG. 5A illustrates one example of an arrival direction calculation method. It is supposed that the difference in arrival times between each of a pair of microphones M1 and M2 is T as illustrated in FIG. 5B. When the distance between the microphones M1 and M2 is d and the sound speed is c, the arrival angle θ of the sounds from the sound source is calculated as Equation 1 below.

$$\theta = \sin^{-1}(c\cdot\tau/d) \quad (1)$$

(3) The process of estimating the sound source position will be described. The sound source position detection unit 113 estimates the position of the sound source, that is, the position of the sound source over a two-dimensional plane that includes the display surface by combining the arrival angles that are respectively calculated for each pair of microphones. As the sound source position that is estimated in such a manner, there are two types. That is, a position within the display surface (within the visual image) and a position that is outside of the display surface (outside of the visual image).

Here, the sound source position detection process by the sound source position detection unit 113 is a process that uses the difference in arrival times of the sounds from the sound source. However, the sound source position detection process by the sound source position detection unit 113 may be other processes, for example, a process using amplitude characteristics and phase characteristics (Domestic Re-Publication of PCT International Publication for Patent Application No. 2004-021031) or the like.

Returning to FIG. 4, the level analysis unit 114 obtains the level information as the sound information of a sound source by analyzing the level of the sounds (strength of the sounds) from the sound source for each sound source for which the sound source position is detected by the sound source position detection unit 113. As described above, differences appear in the arrival times of the sounds from the sound source at each of the microphones 101. Taking the difference in arrival times into consideration, the level analysis unit 114 sums the collected sound information (sound signals) S1 to S4 of the four microphones 101 and obtains the level information of the sound source based on the summed signal.

The frequency analysis unit 115 obtains the frequency information as the sound information of a sound source by analyzing the frequencies of the sounds from the sound source for each sound source for which the sound source position is detected by the sound source position detection unit 113. For example, the frequency analysis unit 115 performs frequency analysis using a plurality of digital filters that extract the frequency components for each type of sound source. Further, the frequency analysis unit 115 is able to perform frequency analysis by, for example, performing an FFT (Fast Fourier Transform) process on the sounds from the sound source.

The display data generation unit 116 generates display data Dds for displaying sound information overlaid on a visual image at a position that corresponds to positional information within the visual image. The display data generation unit 116 generates the display data Dds based on the positional information of the sound source that is detected by the sound source position detection unit 113, the level information of the sounds from the sound source which is obtained by the level analysis unit 114, and the frequency information of the sounds from the sound source which is obtained by the frequency analysis unit 115.

The display data generation unit 116 generates the display data Dds such that the level information of the sounds that are output from the sound source is displayed by the size of a circle. In such a case, the higher the level, the larger the circle. Further, the display data generation unit 116 generates the display data Dds such that the frequency information of the sounds that are output from the sound source is displayed by a color that is applied to the circle. In so doing, in a case when the frequency components of the sounds are different for each type of sound source, each type of sound source becomes identifiable by the color that is applied to the circle.

As described above, there are two types of the positional information of the sound source which is detected by the sound source detection unit 113. That is, there is a case when a position within the display surface (within the visual image) is shown and a case when a position outside of the display surface (outside of the visual image) is shown. The display data generation unit 116 generates, in a case when the sound source position is within the display surface (within the visual image), the display data Dds such that the sound information is displayed at the sound source position or in the vicinity thereof. Further, the display data generation unit 116 generates, in a case when the sound source position is outside of the display surface (outside of the visual image), the display data Dds such that the sound information is displayed on an end portion of the display surface (visual image) which is close to the sound source position.

The processes of each of the units of the signal processing unit 104 illustrated in FIG. 4 are executed, for example, by software processes by, for example, a computer (CPU). In such a case, the computer is made to function as each of the units of the signal processing unit 104 illustrated in FIG. 4 based on a processing program. Naturally, it is also possible to configure a portion or the whole of each of the portions of the signal processing unit 104 illustrated in FIG. 4 by hardware.

The flowchart of FIG. 6 illustrates the processing order of the signal processing unit 104 illustrated in FIG. 4. The signal processing unit 104 periodically repeats the processing order and sequentially renews the display data Dds. The signal processing unit 104 starts the processing in step ST1 before moving to the process of ST2.

In step ST2, the signal processing unit 104 performs filter processing to remove or reduce frequency components such as wind noise or the rustling noise of fabrics that are included in the collected sound information (sound signals) S1 to S4 of the four microphones 101. Furthermore, in step ST3, the signal processing unit 104 performs gain adjustment processing of cutting low level signals such as reflected sounds and stationary sounds from the collected sound information (sound signals) S1 to S4 of the four microphones 101.

Next, in step ST4, the signal processing unit 104 detects the positional information of the sound source based on the collected sound information (sound signals) S1 to S4 of the four microphones 101. Further, in step ST5, the signal processing unit 104 obtains the level information as the sound information of the sound source by analyzing the level of the sounds (strength of the sounds) from the sound source for each sound source for which the sound source position is detected. Furthermore, in step ST6, the signal processing unit 104 obtains the frequency information as the sound information of the sound source by analyzing the frequencies of the sounds from the sound source for each sound source for which the sound source position is detected.

Next, in step ST7, the signal processing unit 104 generates display data based on the positional information of the sound source which is obtained in step ST4, the level information of the sounds from the sound source which is obtained in step ST5, and the frequency information of the sounds from the sound source which is obtained in step ST6. That is, in step ST7, the signal processing unit 104 generates the display data for displaying the sound information overlaid on a visual image at a position that corresponds to the positional information within the visual image. After the process of step ST7, the signal processing unit 104 ends the processing in step ST8.

The actions of the transmissive HMD 10 illustrated in FIGS. 1 and 3 will be described. The collected sound information (sound signals) of the four microphones 101 is supplied to the signal processing unit 104 after being amplified by the amplifier 102 and converted from analog signals into digital signals by the analog-digital converter 103. In the signal processing unit 104, the positional information and the sound information (level information, frequency information) of the sound source are obtained based on the collected sound information (sound signals) of the four microphones 101.

Further, in the signal processing unit 104, the display data for displaying the sound information is generated based on the obtained positional information and the sound information of the sound source. The display data displays the sound information overlaid on a visual image at a position that corresponds to the positional information within the visual image. In such a case, the display data is generated such that the level information of the sounds that are output from the sound source is displayed by the size of a circle. Further, in such a case, the display data is generated such that the frequency information of the sounds that are output from the sound source is shown by the color that is applied to the circle.

The display data that is generated by the signal processing unit 104 is supplied to the display unit 105. In the display unit 105, the sounds information of the sound source is displayed overlaid on a visual image at a position that corresponds to the sound source within the visual image. In such a case, in a case when the sound source position is within the display surface (within the visual image), the sound information is displayed at the sound source position or in the vicinity thereof. Further, in such a case, in a case when the sound source position is outside of the display surface (outside of the visual image), the sound information is displayed on an end portion of the display surface (visual image) which is close to the sound source position.

FIG. 7A illustrates one example of a visual image (actual image) that the user observes through the transmissive HMD 10. Further, FIG. 7B illustrates one example of the sound information (level information, frequency information) that is displayed on the display unit 105. Here, in FIG. 7B, the frequency information of the sounds that are output from a sound source is illustrated by a pattern instead of a color. The user observes an image such as that illustrated in FIG. 7C which is in a state in which the sound information display illustrated in FIG. 7B is superimposed on the visual image illustrated in FIG. 7A. Overlaid on such an image the sound information of the sound source at a position that corresponds to the sound source within the visual image is displayed.

In the transmissive HMD 10 illustrated in FIGS. 1 and 3, the sound information of the sound source is displayed overlaid at a position that corresponds to the sound source within the visual image. Accordingly, it becomes possible for the user to intuitively determine the position of the sound source and information of the sounds that are output from the sound source.

Further, in the transmissive HMD 10 illustrated in FIGS. 1 and 3, the positional information and the sound information of a sound source are obtained based on the collected sound information (sound signals) of the four microphones 101. For such a reason, also with respect to a sound source that is hidden by a predetermined object within a visual image, the sound information of the sound source is able to be displayed overlaid at a position that corresponds to the sound source within the visual image.

Further, in the transmissive HMD 10 illustrated in FIGS. 1 and 3, since the level information of the sounds of the sound source is displayed by the size of a circle, it becomes possible to determine a sense of perspective. For example, it is possible to determine that the sound source is approaching nearer from the circle gradually enlarging. Further, in the transmissive HMD 10 illustrated in FIGS. 1 and 3, since the frequency information of the sounds of the sound source is displayed by the color that is applied to the circle, a specific sound source is able to be searched based on a color.

Further, in the transmissive HMD 10 illustrated in FIGS. 1 and 3, in a case when the sound source position is outside the visual image, the sound information is displayed on an end portion of the visual image which is close to the sound source position. Accordingly, the sound information is able to be displayed even with a sound source that is at a position that is outside the visual image, and further, the user is able to intuitively see which direction with respect to the visual image the sound source is.

Furthermore, in the transmissive HMD 10 illustrated in FIGS. 1 and 3, the surface SFb that is configured by the four microphones 101 that are disposed on the transmissive HMD 10 is configured to not be orthogonal to the display surface SFa of the transmissive HMD 10. In such a case, since the surface SFb becomes the surface in a case when the surface SFb is projected on the display surface SFa, it becomes easy to perform the obtaining of the sound source position over the display surface SFa, that is, over a two-dimensional plane.

Here, in the transmissive HMD 10 illustrated in FIGS. 1 and 3, the analog microphones 101 are used. A configuration of using digital microphones such as MEMS and omitting the amplifier and the analog-digital converter is also possible.

Figure 8A:
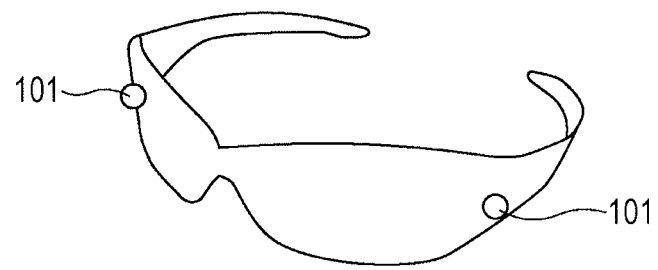
FIGS. 8A and 8B are diagrams for describing other microphone disposal examples to a transmissive HMD.
Figure 8B:
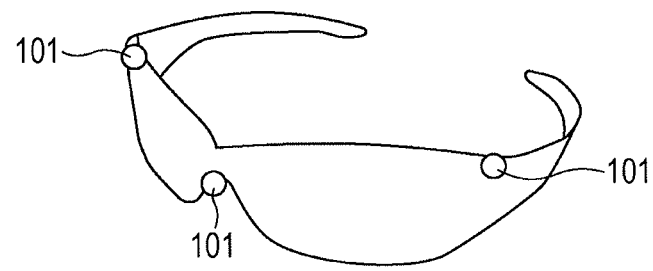

Further, although four microphones 101 are used in the transmissive HMD 10 illustrated in FIGS. 1 and 3, the number of microphones 101 is not limited to four. For example, FIG. 8A illustrates an example in which two microphones 101 are disposed on the front face of the transmissive HMD 10. Further, FIG. 8B illustrates an example in which three microphones 101 are disposed on the front face of the transmissive HMD 10.

It is important for the microphones to be disposed with certain intervals therebetween in order to improve the accuracy of sound source detection. Accordingly, in a case when two microphones 101 are to be disposed on the front face of the transmissive HMD 10, for example, as illustrated in FIG. 8A, the microphones 101 are disposed on the left and right ends. Further, in a case when three microphones 101 are to be disposed on the front face of the transmissive HMD 10, for example, as illustrated in FIG. 8B, the microphones 101 are disposed to form a triangle.

Further, in the transmissive HMD 10 illustrated in FIGS. 1 and 3, the microphones 101 are integrally disposed on the front face of the transmissive HMD 10. However, the microphones 101 may be independent from the transmissive HMD 10. In such a case, a mechanism for passing information of the distance between the microphones 101 and the transmissive HMD 10 and information of the distances between the microphones 101 to the signal processing unit 104 becomes important.

In such a case, it is desirable that the positions of the microphones 101 be fixed near the transmissive HMD 10. A structure in which the transmissive HMD 10 and apparatuses for collecting other sounds are integrated is also possible. Further, in a case when two microphones are to be used, if the microphones are disposed in the vicinity of the auricle, it is also possible to estimate the sound source position by a method using the correlation between both ears, a method using the phase difference between both ears (refer to Japanese Unexamined Patent Application Publication No. 2004-325284), or the like.

With respect to each of the modified examples above, the same is also true of other embodiments described later.

2. Second Embodiment

[Configuration Example of Transmissive Head-Mounted Display]

Figure 9:
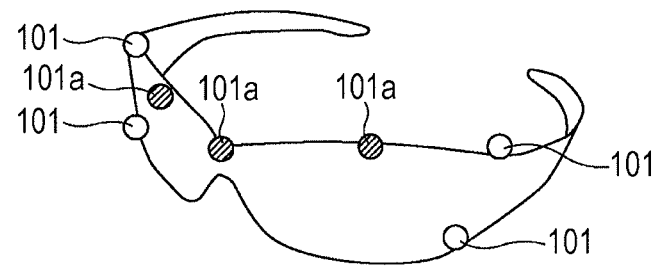
FIG. 9 is a diagram that illustrates the appearance of a transmissive head-mounted display (transmissive HMD) as a second embodiment of the disclosure.

FIG. 9 illustrates the appearance of a transmissive head-mounted display (transmissive HMD) 10A as a second embodiment. Similarly to the transmissive HMD 10 illustrated in FIG. 1, four omnidirectional microphones 101 are disposed on the front face of the transmissive HMD 10A. Further, three directional microphones 101a are disposed on the front face of the transmissive HMD 10A. Here, the microphones 101 and 101a configure the sound collecting units.

Similarly to the transmissive HMD 10 illustrated in FIG. 1, a surface that is configured by the disposal positions of the four microphones 101 is not orthogonal to the display surface of the transmissive HMD 10. Similarly, a surface that is configured by the disposal positions of the three microphones 101a is not orthogonal to the display surface of the transmissive HMD 10. That is, in such a case, the three microphones 101a may not only have disposal positions that are different in the horizontal direction of the display surface but may also have disposal positions that are different in the vertical direction of the display surface.

Figure 10:
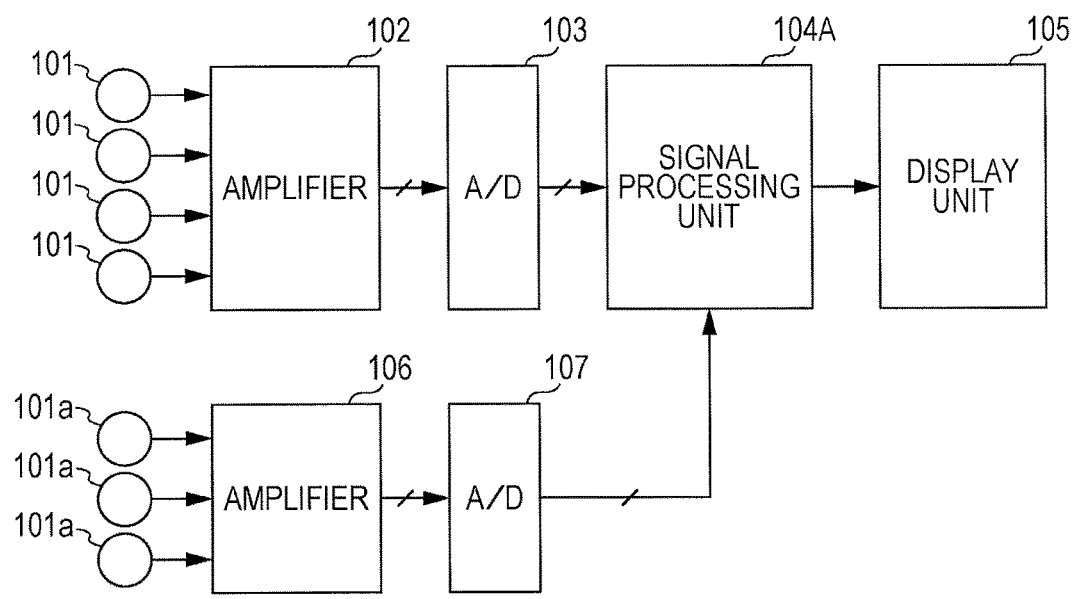
FIG. 10 is a block diagram that illustrates a configuration example of a transmissive HMD system as the second embodiment of the disclosure.

FIG. 10 illustrates a system configuration of the transmissive HMD 10A as the second embodiment. In FIG. 10, the same symbols are given to the portions that correspond to FIG. 3 and the detailed description will be omitted as appropriate. The transmissive HMD 10A includes the four omnidirectional microphones 101, the three directional microphones 101A, amplifiers 102 and 106, analog-digital converters 103 and 107, a signal processing unit 104A, and the display unit 105. For example, the directional microphones 101a are composed of a plurality of microphone arrays and are able to dynamically scan the directional direction.

The amplifier 102 amplifies the collected sound information (sound signals) of the four microphones 101. The analog-digital converter 103 converts the collected sound information (sound signals) of the four microphones 101 which are amplified by the amplifier 102 from analog signals into digital signals. The amplifier 106 amplifies the collected sound information (sound signals) of the three microphones 101a. The analog-digital converter 107 converts the collected sound information (sound signals) of the three microphones 101a which are amplified by the amplifier 106 from analog signals into digital signals.

The signal processing unit 104A obtains the positional information and the sound information of the sound source based on the collected sound information (sound signals) of the four omnidirectional microphones 101 from the analog-digital converter 103 and the collected sound information (sound signals) of the three directional microphones 101a from the analog-digital converter 107. Further, the signal processing unit 104A generates the display data for displaying sound information based on the positional information and the sound information of the sound source. The display data is for displaying overlaid on a visual image at a position that corresponds to the positional information within the visual image. The signal processing unit 104A configures the information obtaining unit and the display data generation unit.

The signal processing unit 104A obtains the positional information of the sound source in the following order. That is, the signal processing unit 104A obtains first directional information of the sound source based on the collected sound information (sound signals) of the four omnidirectional microphones 101. The first directional information is information that indicates the general direction of the sound source. Next, the signal processing unit 104A controls the directional directions of the three directional microphones 101a based on the first directional information and obtains second directional information of the sound source of the disposal positions of the three directional microphones 101a.

In such a case, although control lines from the signal processing unit 104A to the directional microphones 101a are not illustrated in FIG. 10, the directional directions of the directional microphones 101a are controlled by the signal processing unit 104A to scan a predetermined range indicated by the first directional information. The signal processing unit 104A sets the directional direction in which the level of the collected sound information (sound signals) of the directional microphones 101a is the greatest as the second directional information of the sound source of the disposal positions of the directional microphones 101a. The second directional information is information that precisely indicates the direction of the sound source. Furthermore, the signal processing unit 104A obtains the positional information of the sound source based on the second directional information of the sound source of the disposal positions of the three directional microphones 101a.

The display unit 105 displays the sound information of the sound source overlaid on a visual image at a position that corresponds to the sound source within the visual image based on the display data generated by the signal processing unit 104A. In such a case, in a case when the sound source position is within the visual image, the sound source is displayed at the sound source position or in the vicinity thereof. Further, in such a case, in a case when the sound source position is outside the visual image, the sound information is displayed on an end portion of the visual image which is close to the sound source position.

Figure 11:
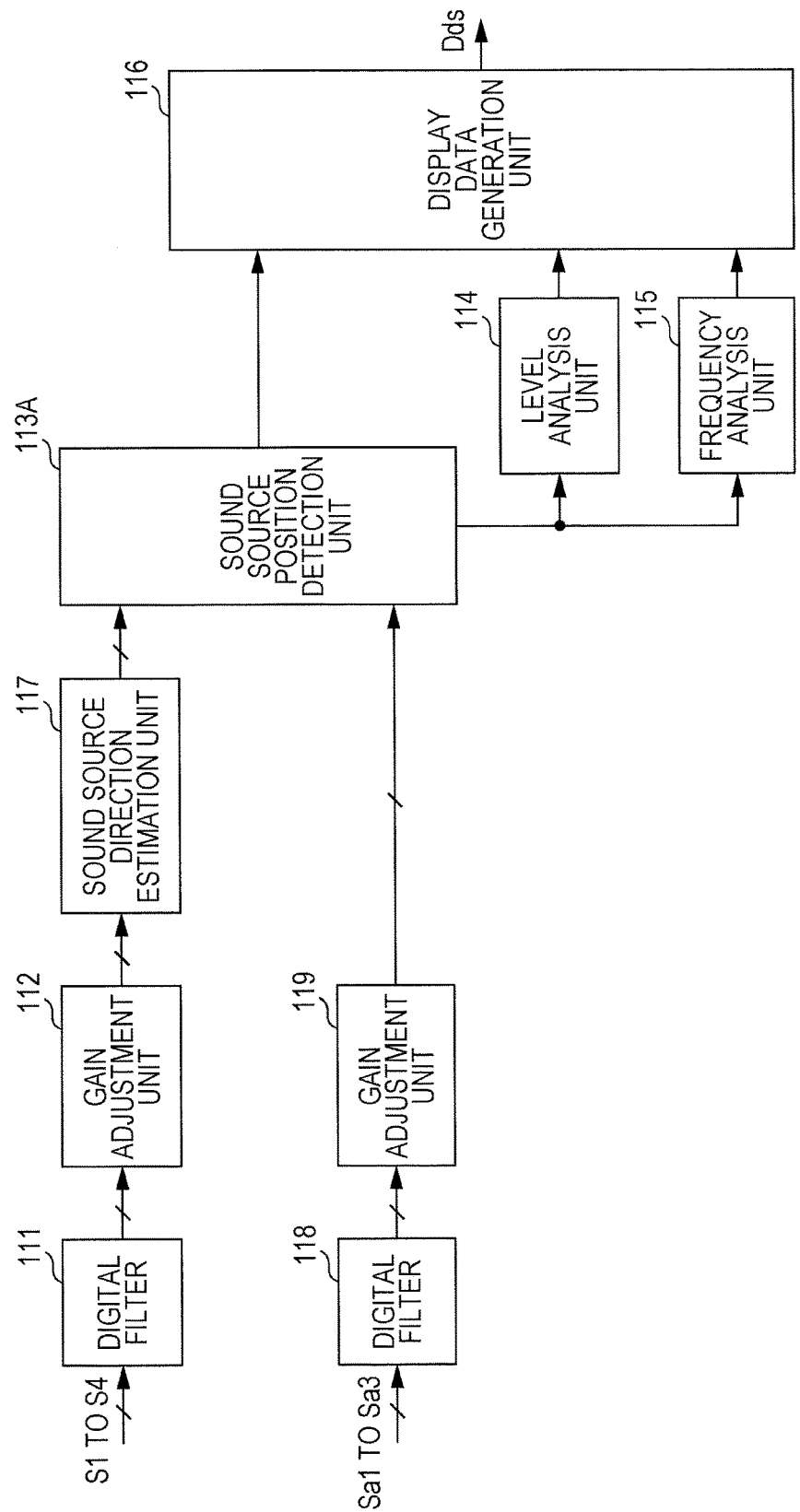
FIG. 11 is a block diagram that illustrates a configuration example of a signal processing unit that configures the transmissive HMD system.

FIG. 11 illustrates a detailed configuration of the signal processing unit 104A. In FIG. 11, the portions that correspond to FIG. 4 are given the same symbols and the detailed description thereof will be omitted as appropriate. The signal processing unit 104A includes digital filters 111 and 118, gain adjustment units 112 and 119, a sound source direction estimation unit 117, a sound source position detection unit 113A, the level analysis unit 114, the frequency analysis unit 115, and the display data generation unit 116.

The digital filter 111 performs filter processing to remove or reduce frequency components such as wind noise or the rustling noise of fabrics that are included in collected sound information (sound signals) S1 to S4 of the four microphones 101. The reason is that such frequency components detrimentally affect the sound source position detection process and the like. The gain adjustment unit 112 cuts low level signals such as reflected sounds and stationary sounds from the collected sound information (sound signals) S1 to S4 of the four microphones 101. The reason is that such low level signals have a detrimental effect on the sound source position detection process and the like.

The sound source direction estimation unit 117 schematically estimates the sound source direction based on the collected sound information (sound signals) S1 to S4 of the four microphones 101 on which the filter processing and the gain adjustment process has been performed. The sound source direction estimation unit 117 performs the two stages of (1) ascertaining the difference in arrival times of sounds from the sound source to each of the microphones 101 and (2) calculating the arrival angles of the sounds from the sound source out of the three stages of the signal processing unit 104 described above in the transmissive HMD 10 illustrated in FIG. 4.

The sound source position detection unit 113A detects the positional information of the sound source based on information of a plurality of arrival angles which is obtained by the sound source direction estimation unit 117 and collected sound information (sound signals) Sa1 to Sa4 of the three directional microphones 101. The sound source position detection unit 113A detects positional information with the display surface of the transmissive HMD 10A, that is, the display surface (two-dimensional plane) of the display unit 105 as the X-Y coordinate.

The sound source position detection unit 113A first obtains the respective sound source directions of the disposal directions for the three directional microphones 101a. In such a case, the sound source direction detection unit 113A controls the directional directions of the directional microphones 101a to scan a predetermined range indicated by the information of the plurality of arrival angles (first directional information of the sound source) which is obtained by the sound source direction estimation unit 117. Furthermore, the sound source position detection unit 113A sets the directional direction in which the collected sound information (sound signals) of the directional microphones 101a is the greatest as the sound source direction of the disposal positions of the directional microphones 101a.

The sound source position detection unit 113A next obtains the positional information of the sound source based on the disposal positions of the three directional microphones 101a and the sound source directional information (second directional information of the sound source). That is, the sound source position detection unit 113A estimates the position of the sound source, that is, the position on a two-dimensional plane that includes the display surface of the sound source by combining the sound source directions of the disposal positions of the three directional microphones 101a. As the sound source position that is estimated in such a manner, there are two types. That is, a position within the display surface (within the visual image) and a position that is outside of the display surface (outside of the visual image).

With respect to each sound source for which the sound source position is detected by the sound source position detection unit 113A, the level analysis unit 114 analyzes the level of the sounds of the sound source (strength of the sounds) which is collected, for example, by the four directional microphones 101 and obtains the level information as the sound information of the sound source. As described above, a difference occurs in the arrival times of the sounds of the sound source to each of the microphones 101.

The level analysis unit 114 sums the collected sound information (sound signals) S1 to S4 of the four microphones 101 taking the difference in arrival times into consideration and obtains the level information of the sound source based on the summed signals. The frequency analysis unit 115 analyses the frequencies of the sounds of the sound source which are collected by, for example, the four directional microphones 101a for each sound source for which the sound source position is detected by the sound source position detection unit 113A and obtains the frequency information as the sound information of the sound source.

The display data generation unit 116 generates the display data Dds for displaying the sound information overlaid on a visual image at a position that corresponds to the positional information within the visual image. The display data generation unit 116 generates the display data Dds based on the positional information of the sound source which is detected by the sound source position detection unit 113A, the level information of the sounds from the sound source which is obtained by the level analysis unit 114, and the frequency information of the sounds from the sound source which is obtained by the frequency analysis unit 115.

The display data generation unit 116 generates the display data Dds such that the level information of the sounds that are output from the sound source is displayed by the size of a circle. In such a case, the higher the level, the larger the circle. Further, the display data generation unit 116 generates the display data Dds such that the frequency information of the sounds that are output from the sound source is displayed by a color that is applied to the circle. In so doing, in a case when the frequency components of the sounds are different for each type of sound source, each type of sound source becomes identifiable by the color that is applied to the circle.

As described above, there are two types of the positional information of the sound source which is detected by the sound source detection unit 113A. That is, there is a case when a position within the display surface (within the visual image) is shown and a case when a position outside of the display surface (outside of the visual image) is shown. The display data generation unit 116 generates, in a case when the sound source position is within the display surface (within the visual image), the display data Dds such that the sound information is displayed at the sound source position or in the vicinity thereof. Further, the display data generation unit 116 generates, in a case when the sound source position is outside of the display surface (outside of the visual image), the display data Dds such that the sound information is displayed on an end portion of the display surface (visual image) which is close to the sound source position.

The processes of each of the units of the signal processing unit 104A illustrated in FIG. 11 are executed, for example, by software processes by, for example, a computer (CPU). In such a case, the computer is made to function as each of the units of the signal processing unit 104A illustrated in FIG. 11 based on a processing program. Naturally, it is also possible to configure a portion or the whole of each of the portions of the signal processing unit 104A illustrated in FIG. 11 by hardware.

Figure 12:
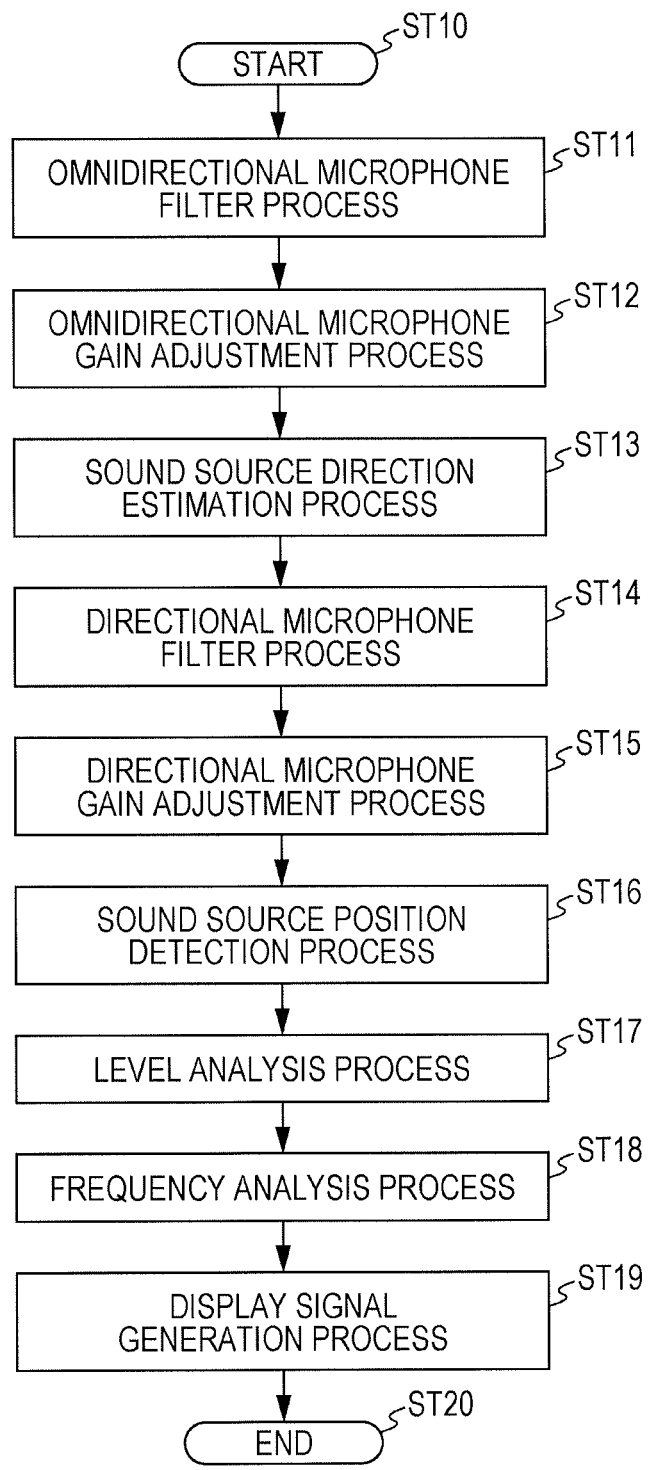
FIG. 12 is a flowchart that illustrates a processing order of the signal processing unit that configures the transmissive HMD system.

The flowchart of FIG. 12 illustrates the processing order of the signal processing unit 104A illustrated in FIG. 11. The signal processing unit 104A periodically repeats the processing order and sequentially renews the display data Dds. The signal processing unit 104A starts the processing in step ST10 before moving to the process of ST11.

In step ST11, the signal processing unit 104A performs filter processing to remove or reduce frequency components such as wind noise or the rustling noise of fabrics that are included in the collected sound information (sound signals) S1 to S4 of the four omnidirectional microphones 101. Furthermore, in step ST12, the signal processing unit 104A performs gain adjustment processing of cutting low level signals such as reflected sounds and stationary sounds from the collected sound information (sound signals) S1 to S4 of the four omnidirectional microphones 101.

Next, in step ST13, the signal processing unit 104A schematically estimates the sound source direction based on the collected sound information (sound signals) S1 to S4 of the four microphones 101 for which filter processing and gain adjustment processing have been performed. In such a case, the signal processing unit 104A performs the two stages of (1) ascertaining the difference in arrival times of sounds from the sound source to each of the microphones and (2) calculating the arrival angles of the sounds from the sound source.

Next, in step ST14, the signal processing unit 104A performs filter processing to remove or reduce frequency components such as wind noise or the rustling noise of fabrics that are included in collected sound information (sound signals) Sa1 to Sa3 of the three directional microphones 101a. Furthermore, in step ST15, the signal processing unit 104A performs gain adjustment processing of cutting low level signals such as reflected sounds and stationary sounds from the collected sound information (sound signals) Sa1 to Sa3 of the three directional microphones 101a.

Next, in step ST16, the signal processing unit 104A detects the positional information of the sound source. In such a case, the signal processing unit 104A detects the positional information of the sound source based on the information of the plurality of arrival angles which is obtained in step ST13 and the collected sound information (sound signals) Sa1 to Sa3 of the three directional microphones 101a for which the filter processing and the gain adjustment processing have been performed.

Next, in step ST17, the signal processing unit 104A obtains the level information as the sound information of the sound source by analyzing the level of the sounds (strength of the sounds) from the sound source for each sound source for which the sound source position has been detected. Furthermore, in step ST18, the signal processing unit 104A obtains the frequency information as the sound information of the sound source by analyzing the frequencies of the sounds from the sound source for each sound source for which the sound source position has been detected.

Next, in step ST19, the signal processing unit 104A generates the display data based on the positional information of the sound source which is obtained in step ST16, the level information of the sounds from the sound source which is obtained in step ST17, and the frequency information of the sounds from the sound source which is obtained in step ST18. That is, in step ST19, the signal processing unit 104A generates the display data for displaying the sound information overlaid on a visual image at a position that corresponds to the positional information within the visual image. After the process of step ST19, the signal processing unit 104A ends the processing in step ST20.

The actions of the transmissive HMD 10A illustrated in FIGS. 9 and 10 will be described. The collected sound information (sound signals) of the four omnidirectional microphones 101 is supplied to the signal processing unit 104A after being amplified by the amplifier 102 and converted from analog signals into digital signals by the analog-digital converter 103. Further, the collected sound information (sound signals) of the three directional microphones 101a is supplied to the signal processing unit 104A after being amplified by the amplifier 106 and converted from analog signals into digital signals by the analog-digital converter 107.

In the signal processing unit 104A, the display data for displaying the sound information is generated by obtaining the positional information and the sound information of the sound source based on the collected sound information (sound signals) of the four omnidirectional microphones 101 and the collected sound information (sound signals) of the three directional microphones 101a. The display data is for displaying the sound information overlaid on a visual image at a position that corresponds to the positional information within the visual image.

In such a case, in the signal processing unit 104A, the first directional information of the sound source (information that indicates the general direction of the sound source) is obtained based on the collected sound information (sound signals) S1 to S4 of the four omnidirectional microphones 101. Next, in the signal processing unit 104A, the directional directions of the three directional microphones 101a are controlled based on the first directional information. Furthermore, the second directional information of the sound source (information that indicates the precise direction of the sound source) of the disposal positions of the three directional microphones 101a is obtained based on the collected sound information (sound signals) Sa1 to Sa3 of the three directional microphones 101a. In addition, in the signal processing unit 104A, the positional information of the sound source is obtained based on the second directional information of the sound source of the disposal positions of the three directional microphones 101a.

The display data that is generated by the signal processing unit 104A is supplied to the display unit 105. In the display unit 105, the sound information of the sound source is displayed based on the display data overlaid on a visual image (refer to FIG. 7C) at a position that corresponds to the sound source within the visual image. In such a case, in a case when the sound source position is within the display surface (within the visual image), the sound information is displayed at the sound source position or in the vicinity thereof. Further, in such a case, in a case when the sound source position is outside of the display surface (outside of the visual image), the sound information is displayed on an end portion of the display surface (visual image) which is close to the sound source position.

Since the transmissive HMD 10A illustrated in FIGS. 9 and 10 is configured similarly to the transmissive HMD 10 illustrated in FIGS. 1 and 3 described above, the same effects are able to be obtained. In the transmissive HMD 10A illustrated in FIGS. 9 and 10, in the signal processing unit 104A, the directional information of the sound source is obtained by the processes of the two stages of a process based on the collected sound information of the four omnidirectional microphones 101 and a process based on the collected sound information of the three directional microphones 101a. Accordingly, it becomes possible to improve the accuracy of obtaining the positional information of the sound source without significantly increasing the number of microphones.

3. Third Embodiment

[Configuration Example of Non-Transmissive Head-Mounted Display]

Figure 13:
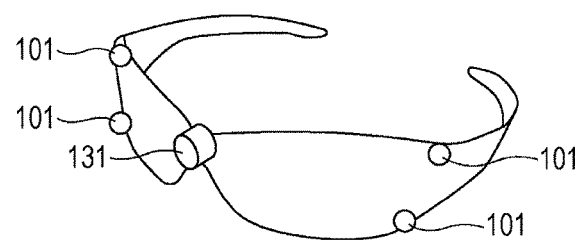
FIG. 13 is a diagram that illustrates the appearance of a non-transmissive head-mounted display (non-transmissive HMD) as a third embodiment of the disclosure.

FIG. 13 illustrates the appearance of a non-transmissive head-mounted display (HMD) 10B as a third embodiment.

Similarly to the transmissive HMD 10 illustrated in FIG. 1, four omnidirectional microphones 101 are disposed on the front face of the transmissive HMD 10B. Further, an image device (camera) 131 for obtaining image data of a visual image is disposed at the center of the front face of the non-transmissive HMD 10B. Here, the microphones 101 configure the sound collecting unit. Similarly to the transmissive HMD 10 illustrated in FIG. 1, a surface that is configured by the disposal positions of the four microphones 101 is not orthogonal to the display surface of the non-transmissive HMD 10B.

Figure 14:
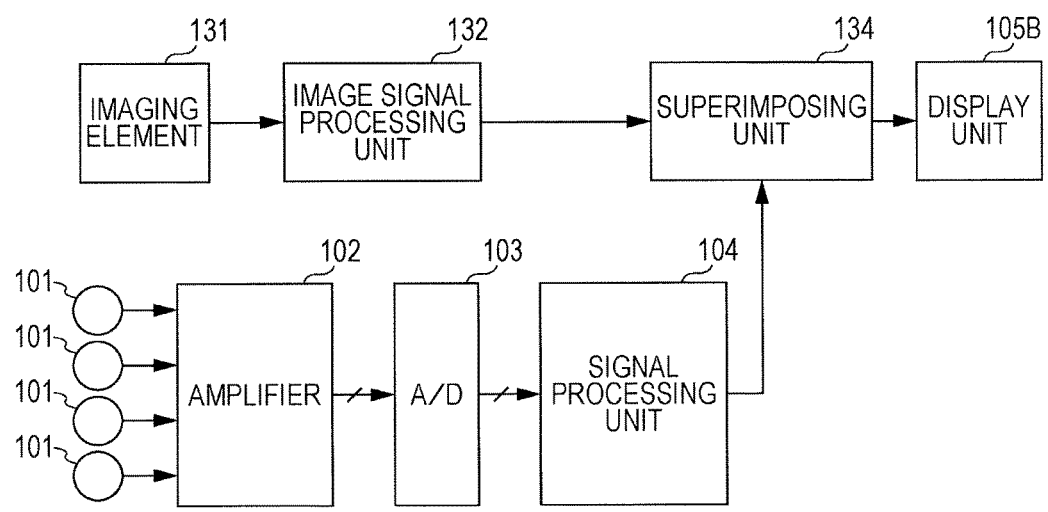
FIG. 14 is a block diagram that illustrates a configuration example of a non-transmissive HMD system as the third embodiment of the disclosure.

FIG. 14 illustrates the system configuration of the non-transmissive HMD 10B as the third embodiment. In FIG. 14, the portions that correspond to FIG. 3 are given the same symbols and the detailed description thereof will be omitted as appropriate. The non-transmissive HMD 10B includes the four omnidirectional microphones 101, the amplifier 102, the analog-digital converter 103, the signal processing unit 104, the image device (camera) 131, the imaging signal processing unit 132, a superimposing unit 134, and a display unit 105B.

The amplifier 102 amplifies the collected sound information (sound signals) of the four microphones 101. The analog-digital converter 103 converts the collected sound information (sound signals) of the four microphones 101 that are amplified by the amplifier 102 from analog signals into digital signals. A signal processing unit 104C generates display data for displaying the sound information by obtaining the positional information and the sound information of the sound source based on the collected sound information (sound signals) of the four microphones 101 obtained by the analog-digital converter 103.

The imaging device (camera) 131 captures a subject that corresponds to the field of vision of the user. The imaging signal processing unit 132 processes imaging signals that are obtained by the imaging device 131 and outputs image data of a visual image. In such a case, in the imaging signal processing unit 132, compensation for the deviation between the captured image and the actual field of vision of the user which occurs depending on the disposal position of the imaging device 131 is also performed. Here, the imaging device 131 and the imaging signal processing unit 132 configures an imaging unit.

The superimposing unit 134 superimposes the display data that is generated by the signal processing unit 104 over the image data of the visual image obtained by the imaging signal processing unit 132. The display unit 105B displays the visual image based on the output data of the superimposing unit 134 and displays the sound information of the sound source overlaid on the visual image at a position that corresponds to the sound source within the visual image. Unlike the display unit 105 of the transmissive HMD 10 illustrated in FIG. 3, the display unit 105B is configured, for example, by a regular liquid crystal display (LCD) from which the backlight unit has not been removed.

The actions of the non-transmissive HMD 10B illustrated in FIGS. 13 and 14 will be described. The collected sound information (sound signals) of the four microphones 101 is supplied to the signal processing unit 104 after being amplified by the amplifier 102 and converted from analog signals to digital signals by the analog-digital converter 103. In the signal processing unit 104, display data for displaying the sound information is generated by the positional information and the sound information of the sound source being obtained based on the collected sound information (sound signals) of the four microphones 101. The display data is for displaying the sound information overlaid on a visual image at a position that corresponds to the positional information within the visual image.

Further, in the imaging device 131, a subject that corresponds to the field of vision of the user is captured. The imaging signal that is output from the imaging device 131 is supplied to the imaging signal processing unit 132. In the imaging signal processing unit 132, the imaging signal is processed and the image data of the visual image is generated. In the imaging signal processing unit 132, a process of compensating for the deviation between the visual image and the actual field of vision of the user which occurs depending on the disposal position of the imaging device 131 is also performed.

The image data of the visual image obtained by the imaging signal processing unit 132 is supplied to the superimposing unit 134. The display data generated by the signal processing unit 104 is supplied to the superimposing unit 134. In the superimposing unit 134, the display data is superimposed on the image data of the visual image. The superimposing data is supplied to the display unit 105B.

In the display unit 105B, the visual image is displayed based on the output data (superimposing data) of the superimposing unit 134 and the sound information of the sound source is displayed overlaid on the visual image at a position that corresponds to the sound source within the visual image (refer to FIG. 7C). In such a case, in a case when the sound source position is within the display surface (within the visual image), the sound information is displayed at the sound source position or in the vicinity thereof. Further, in such a case, in a case when the sound source position is outside of the display surface (outside of the visual image), the sound information is displayed on an end portion of the display surface (visual image) which is close to the sound source position.

With the exception that the visual image is displayed on the display unit 105B as well as the sound information of the sound source, since the non-transmissive HMD 10B illustrated in FIGS. 13 and 14 is similarly configured to the transmissive HMD 10 illustrated in FIGS. 1 and 3 described above, the same effects are able to be obtained. Further, in the non-transmissive HMD 10B illustrated in FIGS. 13 and 14, since the deviation between the visual image and the actual field of vision of the user which occurs depending on the disposal position of the imaging device 131 is compensated in the imaging signal processing unit 132, a favorable visual image that corresponds to the actual field of vision is able to be displayed on the display unit 105B.

Figure 15:
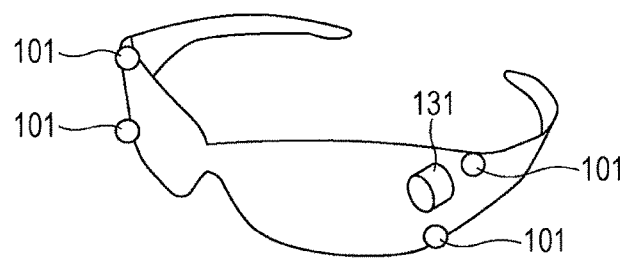
FIG. 15 is a diagram for describing another disposal example of an imaging device (camera) on the non-transmissive HMD.

Here, in the non-transmissive HMD 10B illustrated in FIGS. 13 and 14, although the imaging device (camera) 131 is integrally disposed at the center of the front face of the non-transmissive HMD 10B, the disposal position of the imaging device 131 is not limited thereto. For example, as illustrated in FIG. 15, disposing the imaging device 131 on a side end on the front face of the non-transmissive HMD 10B or at a position that is independent from the non-transmissive HMD 10B may also be considered. Even in such a case, as described above, by the deviation between the visual image and the actual field of vision of the user which occurs depending on the disposal position of the imaging device 131 being compensated in the imaging signal processing unit 132, it becomes possible to display a favorable visual image on the display unit 105B which corresponds to the actual field of vision.

4. Fourth Embodiment

[Configuration Example of Transmissive Head-Mounted Display]

Figure 16:
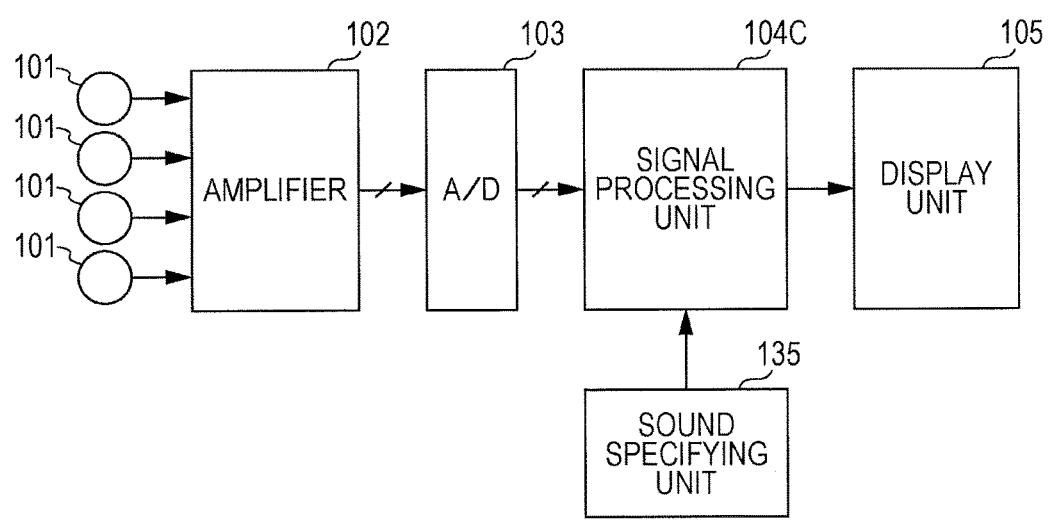
FIG. 16 is a block diagram that illustrates a configuration example of a transmissive HMD system as a fourth embodiment of the disclosure.

FIG. 16 illustrates the configuration of a transmissive head-mounted display (HMD) 10C according to a fourth embodiment. Although not shown in the drawings, the appearance of the transmissive HMD 10C is the same as that of the transmissive HMD 10 illustrated in FIG. 1. In FIG. 16, the portions that correspond to FIG. 3 are given the same symbols, and the detailed described thereof will be omitted as appropriate. The transmissive HMD 10C includes the four omnidirectional microphones 101, the amplifier 102, the analog-digital converter 103, the signal processing unit 104C, the display unit 105, and a sound source specifying unit 135.

The amplifier 102 amplifies the collected sound information (sound signals) of the four microphones 101. The analog-digital converter 103 converts the collected sound information (sound signals) of the four microphones 101 which has been amplified by the amplifier 102 from analog signals into digital signals. The signal processing unit 104C generates display data for displaying the sound information by obtaining the positional information and the sound information of the sound source based on the collected sound information (sound signals) of the four microphones 101 obtained by the analog-digital converter 103.

The sound source specifying unit 135 specifies the sound source as the target for obtaining the positional information and the sound information by the signal processing unit 104C. The sound source specifying unit 135 includes a sound source selection button (not shown) and the like, and allows the user to perform a sound source specifying operation. Although the specifying of the target sound source is able to be performed, for example, with the frequency, the level, or the like of the sounds, in the present embodiment, the specifying of the target sound source is performed with the frequency.

The display unit 105 displays the sound information of the sound source overlaid on a visual image at a position that corresponds to the sound source within the visual image based on the display data generated by the signal processing unit 104C. The display unit 105 is configured, for example, by a transmissive structure in which the backlight unit has been removed from a liquid crystal display (LCD).

The actions of the transmissive HMD 10C illustrated in FIG. 16 will be described. The collected sound information (sound signals) of the four microphones 101 is supplied to the signal processing unit 104C after being amplified by the amplified 102 and converted by the analog-digital converter 103 from analog signals into digital signals. In the signal processing unit 104C, the positional information and the sound information (level information, frequency information) of the sound source are obtained based on the collected sound information (sound signals) of the four microphones 101. In such a case, in the signal processing unit 104C, the positional information and the sound information are obtained with only the sound source specified by the sound source specifying unit 135 as the target.

Further, in the signal processing unit 104C, display data for displaying the sound information is generated based on the obtained positional information and the sound information of the sound source. The display data is for displaying the sound information overlaid on a visual image at a position that corresponds to the positional information within the visual image. In such a case, the display data is generated such that the level information of the sounds that are output from the sound source is displayed by the size of a circle. Further, in such a case, the display data is generated such that the frequency information of the sounds that are output from the sound source is represented by the color that is applied to the circle.

The display data that is generated by the signal processing unit 104C is supplied to the display unit 105. In the display unit 105, the sound information of the sound source is displayed overlaid on a visual image at a position that corresponds to the sound source within the visual image based on the display data (refer to FIG. 7C). In such a case, in a case when the sound source position is within the display surface (within the visual image), the sound information is displayed at the sound source position or in the vicinity thereof. In such a case, in a case when the sound source position is on the outside of the display surface (outside of the visual image), the sound information is displayed on an end portion of the display surface (visual image) which is close to the sound source position.

Since the transmissive HMD 100 illustrated in FIG. 16 is configured similarly to the transmissive HMD 10 illustrated in FIGS. 1 and 3 described above, the same effects are able to be obtained. Further, in the transmissive HMD 10C illustrated in FIG. 16, in the signal processing unit 104C, the positional information and the sound information are obtained with only the sound source specified by the sound source specifying unit 135 as the target. Accordingly, it is possible to display only the sound information of the specified sound source within the visual image and searching of a specified sound source becomes easy.

5. Modified Examples

Here, in the embodiments described above, an example in which the sound information of the sound information is the level information or the frequency has been described. However, as the sound information, other types of information are also considered. For example, there is (1) character information that represents words that are determined by voice recognition, (2) imitative words that indicate the sounds of objects that are obtained from the sounds of the environment (sound of a moving train), (3) onomatopoeias that indicate the sounds of living things, and (4) the time domain waveform, the power spectrum, the frequency spectrum, and the like of the sound signal.

Further, in the embodiments described above, an example in which the level information of the sounds from the sound source is displayed by the size of a circle has been described. However, a display shape other than a circle is also possible. For example, there is (1) a polygon, (2) an arrow, (3) a speech bubble, and (4) the font or the like depending on the type of sounding body such as human voices, other living things, and the sounds of the environment.

Further, in the embodiments described above, an example in which the frequency information of the sounds from the sound source is displayed by the color that is applied to the circle has been described. However, color coding and displaying (1) the gender of a person, (2) the voice of a person, (3) the type of sounding bodies such as other living things and the sounds of the environment and further displaying strength of the sounds by the shading of the color or the like may be considered.

The present disclosure contains subject matter related to that disclosed in Japanese Priority Patent Application JP 2010-286934 filed in the Japan Patent Office on Dec. 24, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sound information display device, comprising:
a display screen; and
one or more processors configured to:
control the display screen to display a visual image that comprises a first object and a second object;
obtain positional information and sound level information of each of a first sound source associated with the first object, a second sound source hidden in the second object, and a third sound source outside the visual image,
wherein the sound level information indicates a strength of sound output from each of the first sound source, the second sound source, and the third sound source;
determine a position of each of the first sound source in the visual image, the second sound source in the visual image, and the third sound source outside the visual image, based on the obtained positional information of the first sound source, the second sound source, and the third sound source;
control the display screen to display a first shape overlaid on the first object in the visual image,
wherein the first shape indicates the obtained sound level information of the first sound source;
control the display screen to display a second shape overlaid on the second object in the visual image,
wherein the second shape indicates the obtained sound level information of the second sound source;
determine an end portion of the visual image which corresponds to the determined position of the third sound source outside the visual image; and
control the display screen to display a third shape overlaid on the end portion of the visual image,
wherein the third shape indicates the obtained sound level information of the third sound source.

2. The sound information display device according to claim 1, further comprising:
an image display unit that includes the display screen; and
a plurality of sound collecting units on the image display unit,
wherein the one or more processors are further configured to obtain the sound level information from the plurality of sound collecting units, and
wherein the plurality of sound collecting units is on a surface non-orthogonal to the display screen of the image display unit.

3. The sound information display device according to claim 1, further comprising:
an image display unit that includes the display screen; and
a plurality of sound collecting units on the image display unit, wherein
the one or more processors are further configured to obtain the sound level information from the plurality of sound collecting units,
the plurality of sound collecting units is in a line arrangement, and
the line arrangement of the plurality of sound collecting units is parallel to the display screen of the image display unit.

4. The sound information display device according to claim 1, wherein the one or more processors are further configured to control the display screen to display frequency information of the sound output from each of the first sound source, the second sound source, and the third sound source.

5. The sound information display device according to claim 4, wherein a color of each of the first shape, the second shape, and the third shape indicates the frequency information.

6. The sound information display device according to claim 5, wherein the one or more processors are further configured to search a specific sound source based on the color.

7. The sound information display device according to claim 1, further comprising a plurality of sound collecting units configured to collect the sound level information, wherein
the plurality of sound collecting units comprises a plurality of omnidirectional sound collecting units and a plurality of directional sound collecting units,
the sound level information includes first directional information,
the first directional information of each of the first sound source, the second sound source, and the third sound source is obtained based on the sound level information collected by the plurality of omnidirectional sound collecting units, and
the one or more processors are further configured to:
control a direction of the plurality of directional sound collecting units based on the first directional information; and
obtain the positional information of the first sound source, the second sound source, and the third sound source based on second directional information,
wherein the second directional information is obtained based on the controlled direction of the plurality of directional sound collecting units.

8. The sound information display device according to claim 1, wherein the one or more processors are further configured to specify the first sound source, the second sound source, and the third sound source as a target to obtain the positional information and the sound level information.

9. The sound information display device according to claim 1, wherein the one or more processors are further configured to specify the first sound source, the second sound source, and the third sound source as a target to obtain frequency information of the sound output from each of the first sound source, the second sound source, and the third sound source.

10. The sound information display device according to claim 1, wherein the display screen is a transmissive image display screen.

11. The sound information display device according to claim 10, wherein
the displayed sound level information indicates gender information associated with the first sound source, the second sound source, and the third sound source, and
the gender information is determined based on the sound output from the first sound source, the second sound source, and the third sound source.

12. The sound information display device according to claim 10, wherein
the displayed sound level information indicates onomatopoeia information, and
the one or more processors are further configured to determine the onomatopoeia information based on the sound output from the first sound source, the second sound source, and the third sound source.

13. The sound information display device according to claim 1, wherein the display screen is a non-transmissive image display screen.

14. The sound information display device according to claim 1, wherein the sound level information is a sum of sound signals obtained from the first sound source, the second sound source, and the third sound source.

15. A sound information display method, comprising:
in a sound information display device that comprises a display screen:
controlling the display screen to display a visual image that comprises a first object and a second object;
obtaining positional information and sound level information of each of a first sound source associated with the first object, a second sound source hidden in the second object, and a third sound source outside the visual image,
wherein the sound level information indicates a strength of sound output from each of the first sound source, the second sound source, and the third sound source;
determining a position of each of the first sound source in the visual image, the second sound source in the visual image, and the third sound source outside the visual image, based on the obtained positional information of the first sound source, the second sound source, and the third sound source;
controlling the display screen to display a first shape overlaid on the first object in the visual image,
wherein the first shape indicates the obtained sound level information of the first sound source;
controlling the display screen to display a second shape overlaid on the second object in the visual image,
wherein the second shape indicates the obtained sound level information of the second sound source;
determining an end portion of the visual image which corresponds to the determined position of the third sound source outside the visual image; and
controlling the display screen to display a third shape overlaid on the end portion of the visual image,
wherein the third shape indicates the obtained sound level information of the third sound source.

16. The sound information display method according to claim 15, wherein the sound level information is obtained from a plurality of sound collecting units, and wherein the plurality of sound collecting units is on a surface non-orthogonal to the display screen of an image display unit of the sound information display device.

17. The sound information display method according to claim 15, wherein
the sound level information is obtained from a plurality of sound collecting units,
the plurality of sound collecting units is in a line arrangement, and
the line arrangement of the plurality of sound collecting units is parallel to the display screen of an image display unit of the sound information display device.

18. The sound information display method according to claim 15, further comprising controlling the display screen to display frequency information of the sound output from each of the first sound source, the second sound source, and the third sound source.

19. The sound information display method according to claim 18, wherein a color of each of the first shape, the second shape, and the third shape indicates the frequency information.

20. A non-transitory computer-readable medium having stored thereon computer-executable instructions that, when executed by a processor, cause the processor to execute operations, the operations comprising:
controlling a display screen to display a visual image that comprises a first object and a second object;
obtaining positional information and sound level information of each of a first sound source associated with the first object, a second sound source hidden in the second object, and a third sound source outside the visual image,
wherein the sound level information indicates a strength of each of sound output from the first sound source, the second sound source, and the third sound source;
determining a position of each of the first sound source in the visual image, the second sound source in the visual image, and the third sound source outside the visual image, based on the obtained positional information of the first sound source, the second sound source, and the third sound source;
controlling the display screen to display a first shape overlaid on the first object in the visual image,
wherein the first shape indicates the obtained sound level information of the first sound source;
controlling the display screen to display a second shape overlaid on the second object in the visual image,
wherein the second shape indicates the obtained sound level information of the second sound source;
determining an end portion of the visual image which corresponds to the determined position of the third sound source outside the visual image; and
controlling the display screen to display a third shape overlaid on the end portion of the visual image,
wherein the third shape indicates the obtained sound level information of the third sound source.

* * * * *